United States Patent
Isaksson et al.

(10) Patent No.: US 6,738,440 B1
(45) Date of Patent: May 18, 2004

(54) SUBSCRIBER LINE TRANSMISSION SYSTEMS

(75) Inventors: Mikael Isaksson, Lulea (SE); Magnus Johansson, Lulea (SE); Lennart Olsson, Lulea (SE); Tomas Stefansson, Lulea (SE); Hans Ohman, Lulea (SE); Gunnar Bahlenberg, Lulea (SE); Anders Isaksson, Lulea (SE); Goran Okvist, Lulea (SE); Lis-Marie Ljunggren, Lulea (SE); Daniel Bengtsson, Lulea (SE); Sven-Rune Olofsson, Lulea (SE); Joachim Johansson, Lulea (SE); Per Ola Borjesson, Morrum (SE); Niklas Grip, Lulea (SE); Richard Nilsson, Lulea (SE); Frank Sjoberg, Lulea (SE); Sarah Wilson, Menlo Park, CA (US); Per Odling, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/530,947
(22) PCT Filed: Nov. 11, 1998
(86) PCT No.: PCT/SE98/02030
§ 371 (c)(1),
(2), (4) Date: Dec. 27, 2000
(87) PCT Pub. No.: WO99/26365
PCT Pub. Date: May 27, 1999

(30) Foreign Application Priority Data

Nov. 18, 1997 (SE) .............................................. 9704256

(51) Int. Cl.$^7$ ............................................. H04B 15/00
(52) U.S. Cl. ........................ 375/349; 375/350; 455/303
(58) Field of Search .............................. 375/224, 226, 375/227, 260, 285, 340, 346, 349, 350; 370/497; 455/296, 311, 303

(56) References Cited

U.S. PATENT DOCUMENTS 6,456,673 B1 * 9/2002 Wiese et al. ................ 375/346

(List continued on next page.)

FOREIGN PATENT DOCUMENTS

EP 0 772 309 5/1997

(List continued on next page.)

OTHER PUBLICATIONS

J. A. C. Bingham, IEEE Globecom 1996 Communications: The Key to Global . . . , vol. 2, pp. 1026 to 1030, "RFI Suppression in Multcarrier Transmission Systems", Nov. 1996.

(List continued on next page.)

Primary Examiner—Amanda T. Le
(74) Attorney, Agent, or Firm—Lisa K. Jorgenson; Allen, Dyer, Doppelt, Milbrath & Gilchrist, P.A.

(57) ABSTRACT

A RFI canceller, for use in a subscriber line system using multi-carrier modulation, measures a RFI disturbance in carriers falling within a band of frequencies causing the RFI. The RFI ingress into carriers outside the band of frequencies is estimated, and an error correcting signal derived from the estimation of the RFI ingress is subtracted from a received signal. The subscriber line system may be a VDSL system and the multi-carrier modulation may be DMT. The RFI canceller includes a demodulator for demodulating an incoming data stream to provide a first parallel data stream. A parallel to serial convertor converts the first parallel data stream to a first serial data stream. A digital to analogue convertor converts the first serial data stream to a first analogue signal. An analogue RFI canceller circuit combines the analogue signal with an analogue error correcting signal, to produce a second analogue signal. An analogue to digital convertor converts the second analogue signal to a second serial data signal. A serial to parallel convertor converts the second serial data stream to a second parallel data stream. A modulator modulates the second parallel data stream onto a multiplicity of carriers.

47 Claims, 3 Drawing Sheets

U.S. PATENT DOCUMENTS

2002/0054610 A1 * 5/2002 Reusens et al. ............. 370/480
2002/0123321 A1 * 9/2002 Antoine et al. ............. 455/296

FOREIGN PATENT DOCUMENTS

| EP | 0 773 642 | 5/1997 |
| EP | 0 773 643 | 5/1997 |
| EP | 0 785 636 | 7/1997 |
| EP | 0 862 300 | 9/1998 |

OTHER PUBLICATIONS

D. Schmucking, et al., Broadband Acces Networks, pp. 84 to 91, "Spectral Compatibility—A Prerequisite for Maximizing the Potential of Twisted–Pair Access Networks", Jun. 1997.

* cited by examiner

SUBSCRIBER LINE TRANSMISSION SYSTEMS

This Application is a 371 at PCT/SE98/02030, filed on Nov. 11, 1998.

BACKGROUND OF THE INVENTION

1. Field of the Invention

The present invention relates to RFI (Radio Frequency Interference) cancellers for use in subscriber line transmission systems, subscriber line transmission systems incorporating RFI cancellers, receivers, incorporating RFI cancellers, for use with subscriber line transmission systems, and methods of suppressing RFI in telecommunications wire transmission systems employing multi-carrier modulation. The invention has particular application to VDSL systems employing DMT.

2. Discussion of the Background

The frequency range occupied by VDSL contains several frequency bands, the HAM bands, which are reserved for amateur radio users. VDSL signals on an unshielded twisted wire pair will be disturbed by these radio frequency signals, through common mode (CM) to differential mode (DM) conversion. The commonest example of an RFI signal is the disturbance that VDSL systems receive from a nearby HAM radio transmitter. An analogue RFI canceller, that uses the coupling between CM and DM, can be used to bring the RFI down to a level where it does not saturate the A/D converter in the VDSL receiver. But even if an analog RFI canceller is used, the level of disturbance left can still severely damage the performance of a VDSL system.

SUMMARY OF THE INVENTION

The present invention seeks to reduce the RFI in the frequency domain of a DMT based VDSL system after A/D conversion.

Frequency domain Radio Frequency Interference (RFI)-cancellation in the present invention uses a series expansion of the transfer function from the RFI disturbance to the DMT carriers.

Although the present invention is described in relation to VDSL systems employing DMT, it will be apparent to those skilled in the art that the present invention can also be applied to ADSL and related systems, using any multi-carrier modulation method. The necessary modifications of the present invention needed to apply it to alternative subscriber line transmission systems using multi-carrier modulation, will be immediately apparent to those skilled in the art.

According to a first aspect of the present invention, there is provided a RFI canceller, for use in a subscriber line system using multi-carrier modulation, characterised in that measurement means are provided for measuring a RFI disturbance in carriers falling within a band of frequencies causing said RFI, in that estimation means are provided for estimating RFI ingress into carriers outside said band of frequencies, and in that adder means are provided for subtracting an error correcting signal derived from said estimation means from a received signal.

Preferably, said subscriber line system is a VDSL system and said multi-carrier modulation is DMT.

Said RFI canceller includes:
a demodulator means for demodulating an incoming data stream to provide a first parallel data stream;
a parallel to serial convertor for converting said first parallel data stream to a first serial data stream;
a digital to analogue convertor for converting said first serial data stream to a first analogue signal;
an analogue RFI canceller circuit for combining said analogue signal with an analogue error correcting signal, to produce a second analogue signal;
an analogue to digital convertor to convert said second analogue signal to a second serial data signal;
a serial to parallel convertor for converting said second serial data stream to a second parallel data stream;
a modulator means for modulating said second parallel data stream onto a multiplicity of carriers; and
a digital RFI canceller means including said measurement means, said estimation means and said adder means.

Equaliser means may be connected to an output of said digital RFI canceller means.

Said demodulator means may be adapted to perform an inverse discrete Fourier transformation on an incoming digital signal, and said modulator means may be adapted to perform a discrete Fourier transformation on an outgoing digital signal.

Said band of frequencies may be narrow compared to a band of frequencies occupies by said multi-carriers.

Said band of frequencies may correspond to the HAM band.

Said measurement means may operate on at least one carrier within said band of frequencies.

Said estimation means may approximate a transfer function:

$$G_k(f) = \frac{1 - e^{j\frac{4\pi f N}{f_s}}}{1 - e^{j\left(2\pi\frac{f}{f_s} - \frac{\pi}{N}k\right)}}$$

from the RFI disturbance to the DMT carriers, by a linear combination of a predefined set of basis functions.

Said estimation means may approximate only the denominator of $G_k(f)$, namely:

$$\frac{1}{1 - e^{j\left(\frac{2\pi f}{f_s} - \frac{\pi}{N}k\right)}}$$

Said measuring means may only perform measurements on carriers having frequencies that are not close to a centre frequency of the RFI disturbance.

Said basis functions may be polynomials.

Said basis functions $$\phi_{k,n}: k \in M \cup U$$

may bee defined by a linearized model of said RFI disturbance $$S_k \approx \hat{S}_k = \sum_{n=1}^{L+M} \alpha_n \varphi_{k,n}$$

where $\alpha_n$ are unknown coefficients calculated by using a least-squares fit technique.

Said estimation means may derive said basis functions by means of a Taylor expansion from a linearized model of said RFI disturbance, namely:

$$S_k \approx \hat{S}_k = \sum_{l=0}^{L-1} A_l D_k^{(l)}(-f_c) + \sum_{m=0}^{M-1} B_m D_k^{(m)}(-f_c)$$

where $\{A_l\} \cup \{B_l\}$ is a set of L+M unknown parameter coefficients calculated by said estimation means.

No more than one thousand basis functions may be employed.

No more than ten basis functions may be employed.

According to a second aspect of the present invention, there is provided a subscriber line system using multi-carrier modulation, characterised in that said subscriber line system includes at least one RFI canceller as setforth in any preceding paragraph.

Said subscriber line system may be a VDSL system.
Said subscriber line system may be an ADSL system.
Said multi-carrier modulation may be DMT.

According to a third aspect of the present invention, there is provided a receiver for use with a subscriber line system, as set forth in any preceding paragraph, characterised in that said receiver includes a RFI canceller as set forth in any preceding paragraph.

According to a fourth aspect of the present invention, there is provided a method of reducing RFI in a telecommunications wire transmission system employing multi-carrier modulation characterised by:

measuring a disturbance signal induced by RFI in carriers falling within a band of frequencies causing said RFI;

estimating RFI ingress into carriers outside said band of frequencies; and subtracting an error correcting signal, derived from an estimation of said RFI ingress, from a received signal.

Said telecommunications wire transmission system may be a VDSL system.

Said telecommunications wire transmission system may be an ADSL system.

Said multi-carrier modulation may be DMT.
Said method may include the steps of:
demodulating an incoming data stream;
converting demodulated data to a first serial data stream;
converting said serial data stream to a first analogue signal;
combining said first analogue signal with an analogue error correcting signal, to produce a second analogue signal;
converting said second analogue signal to a second serial data stream;
converting said second serial data stream to a parallel data stream;
modulating said parallel data stream onto a multiplicity of carriers; and then
measuring a disturbance induced by RFI in carriers falling within a band of frequencies causing said RFI;
estimating RFI ingress into carriers outside said band of frequencies; and
subtracting an error correcting signal, derived from an estimation of said RFI ingress, from a received signal.

An outgoing data stream may be equalised.

An inverse discrete Fourier transformation may be performed on an incoming digital signal to demodulate said incoming digital signal, and a discrete Fourier transformation may be performed on an outgoing digital signal to modulate said outgoing signal.

Said band of frequencies may be narrow compared to a band of frequencies occupies by said multi-carriers.

Said narrow band of frequencies may correspond to the HAM band.

Said measurements may be performed on at least one carrier within said band of frequencies.

Said step of estimating may approximate a transfer function:

$$G_k(f) = \frac{1 - e^{j\frac{4\pi fN}{f_s}}}{1 - e^{j\left(2\pi \frac{f}{f_s} - \frac{\pi}{N}k\right)}}$$

from the RFI disturbance to the DMT carriers by a linear combination of a predefined a set of basis functions.

Only the denominator of $G_k(f)$ may be approximated, namely:

$$\frac{1}{1 - e^{j\left(\frac{2\pi f}{f_s} - \frac{\pi}{N}k\right)}}$$

Measurements may be performed only carriers having frequencies that are not close to a centre frequency of said RFI disturbance signal.

Said basis functions may be polynomials.
Said basis functions $\phi_{k,n}: k \in M \cup U$ may be defied by a linearized model of said RFI disturbance $$S_k \approx \hat{S}_k = \sum_{n=1}^{L+M} \alpha_n \varphi_{k,n}$$

where $\alpha_n$ are unknown coefficients calculated by using a least-squares fit technique.

Said basis functions may be derived from a Taylor expansion of a linearized model of said RFI disturbance, namely:

$$S_k \approx \hat{S}_k = \sum_{l=0}^{L-1} A_l D_k^{(l)}(-f_c) + \sum_{m=0}^{M-1} B_m D_k^{(m)}(-f_c)$$

where $\{A_l\} \cup \{B_l\}$ is a set of L+M unknown parameter coefficients and said set of L+M parameters may be calculated.

No more than one thousand basis functions may be employed.

No more than ten basis functions may be employed.

BRIEF DESCRIPTION OF THE DRAWINGS

Embodiments of the invention will now be described, by way of example, with reference to the accompanying drawings, in which.

DESCRIPTION OF THE PREFERRED EMBODIMENT

In order to facilitate an understanding of the present invention a glossary of terms used in the description of the present invention is provided below:

| | |
|---|---|
| A/D: | Analogue to Digital |
| ADSL: | Asynchronous Digital Subscriber Line |
| CM: | Common Mode |
| D/A: | Digital to Analogue |
| DFT: | Discrete Fourier Transform |
| DM: | Differential Mode |
| DMT: | Discrete Multi Tone |
| HAM: | Amateur radio |
| IDFT: | Inverse Discrete Fourier Transform |
| RFI: | Radio Frequency Interference |
| VDSL: | Very high bit-rate Digital Subscriber Line |

As previously explained, the frequency range occupied by VDSL contains several frequency bands, the HAM bands, which are reserved for amateur radio users. This means that VDSL signals, on an unshielded twisted wire pair, can easily be adversely affected by amateur radio frequency transmissions, through common mode (CM) to differential mode (DM) conversion. Although an analogue RFI canceller, using the coupling between CM and DM, can bring the RFI down to a level where it does not saturate the A/D converter in the VDSL receiver, the level of disturbance left can still severely degrade the performance of a VDSL system.

The present invention can be used to reduce the RFI in the frequency domain of a DMT based VDSL system after the A/D conversion.

Figure 1:
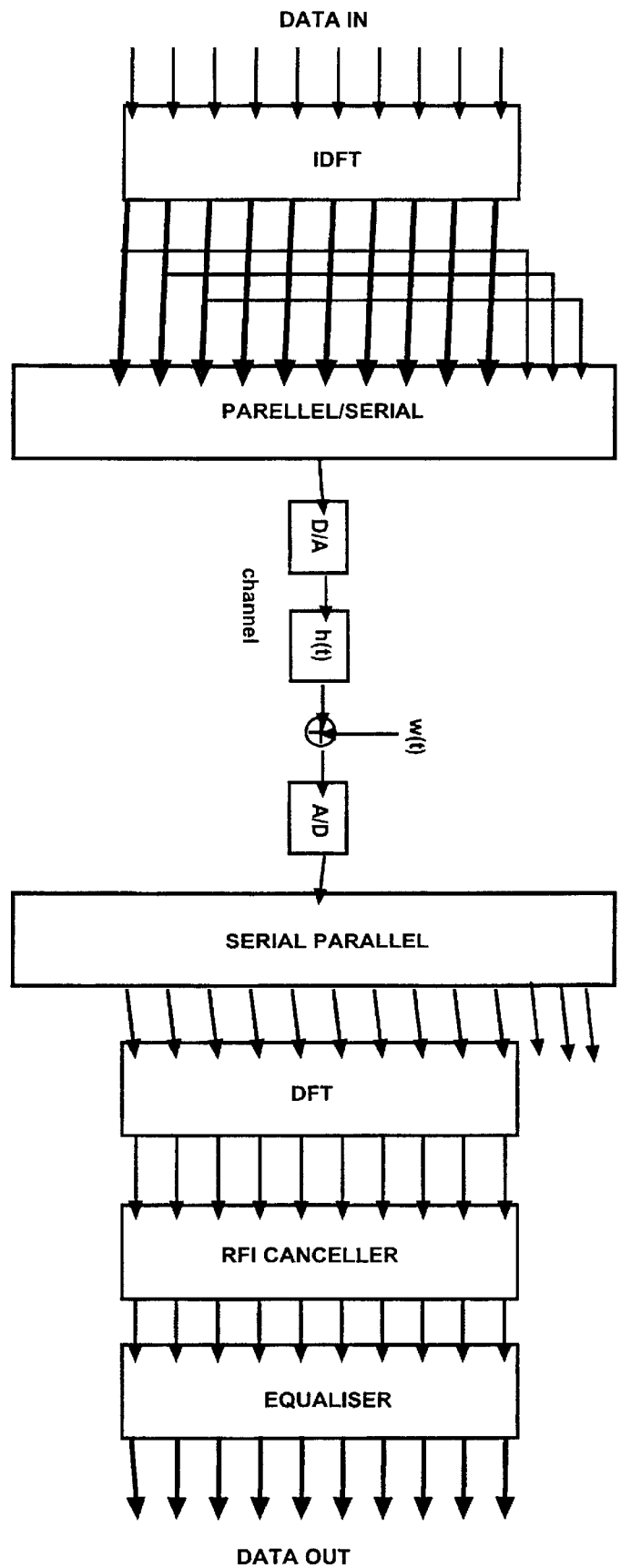
FIG. 1 illustrates, in schematic form, the location of apparatus for effecting RFI suppression according to the present invention, in a DMT transmission system.

Operation of the present invention is illustrated in FIG. 1. A known technique for analogue RFI cancellelation may be used with the present invention. With such a technique the incoming signal, after it has been subjected to a Inverse Discrete Fourier Transformation (IDFT), parallel to serial conversion and digital to analogue conversion, is combined with an error correcting signal w(t). The present invention is implemented in the block labelled RFI canceller. As illustrated in FIG. 1, an incoming data signal is subjected to the following processes:

IDFT;

parallel to serial conversion

D/A conversion;

analogue RFI cancellation;

A/D conversion;

serial to parallel conversion;

DFT;

RFI cancellation, according to the present invention; and equalisation.

Figure 2:
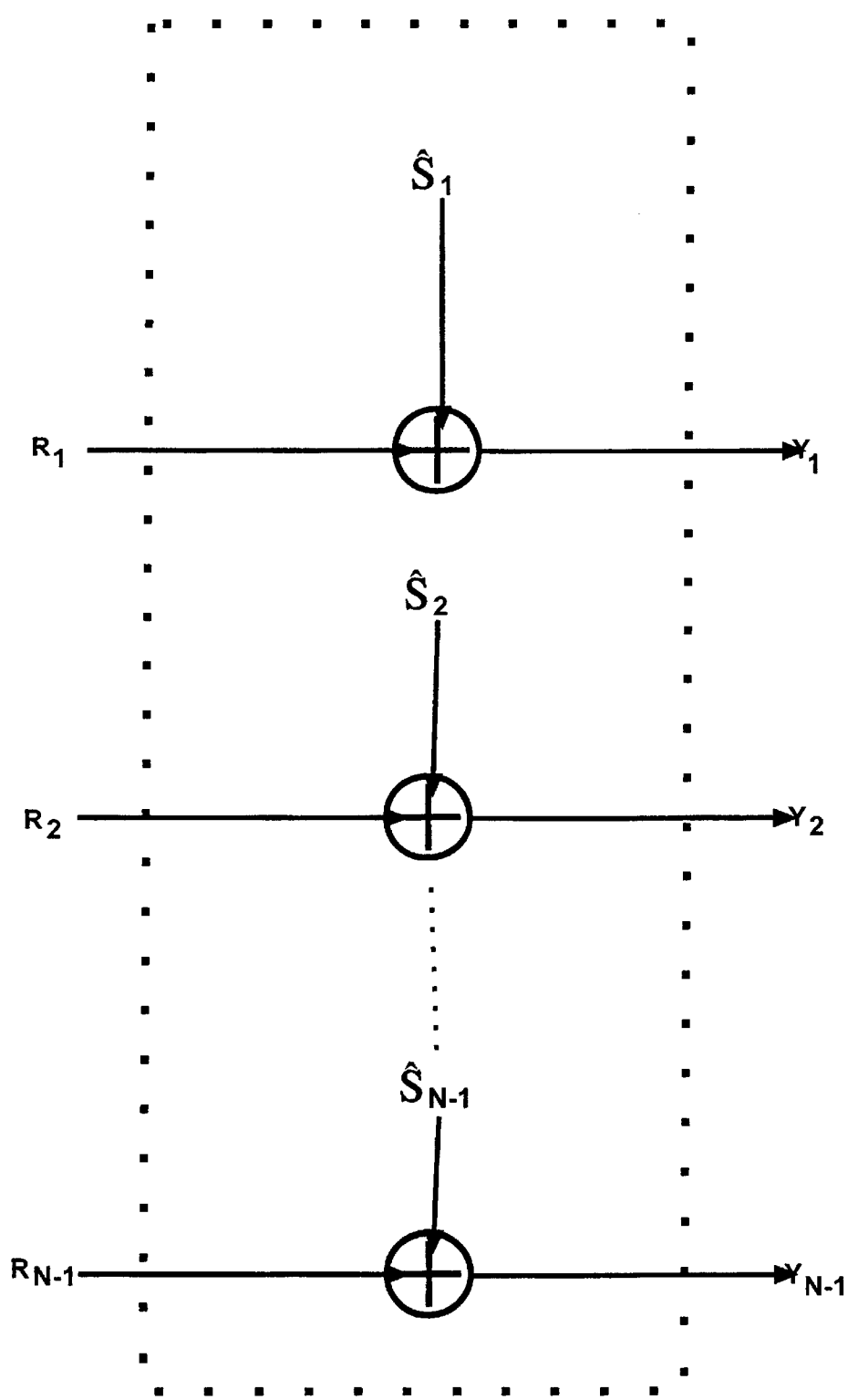
FIG. 2 is a schematic representation of the operation of the present invention.

The detailed operation of the RFI cancellation unit, illustrated in FIG. 1, is shown in FIG. 2. The received signals $R_1, R_2, \ldots, R_{N-1}$, are combined with signals $\hat{S}_1, \hat{S}_2, \ldots, \hat{S}_{N-1}$, to give output signals $Y_1, Y_2, \ldots, Y_{N-1}$, where:

$R_1 = X_1 - H_1 - S_1 + N_1$;

$R_2 = X_2 - H_2 + S_2 + N_2$;

$R_{N-1} = X_{N-1} - H_{N-1} + S_{N-1} + N_{N-1}$;

$Y_1 = X_1 - H_1 + (S_1 - \hat{S}_1) + N_1$;

$Y_2 = X_2 - H_2 + (S_2 - \hat{S}_2) + N_2$; and $Y_{N-1} = X_{N-1} - H_{N-1} + (S_{N-1} - \hat{S}_{N-1}) + N_{N-1}$.

A VDSL system cannot transmit any information on carriers in the HAM bands, that is to say, carriers in the HAM band are unmodulated. The method employed by the present invention measures the RFI signal on a number of unmodulated DMT carriers. The RFI disturbance (interference signal) is parameterized. The parameters for this process are estimated using measurements on the unmodulated DMT carriers. Using these parameter estimates, the impact of the RFI signal on all other DMT carriers can be calculated and subtracted from the modulated DMT carriers that convey the received signal. After the subtraction process the interference from RFI on the DMT signal is reduced.

Figure 3:
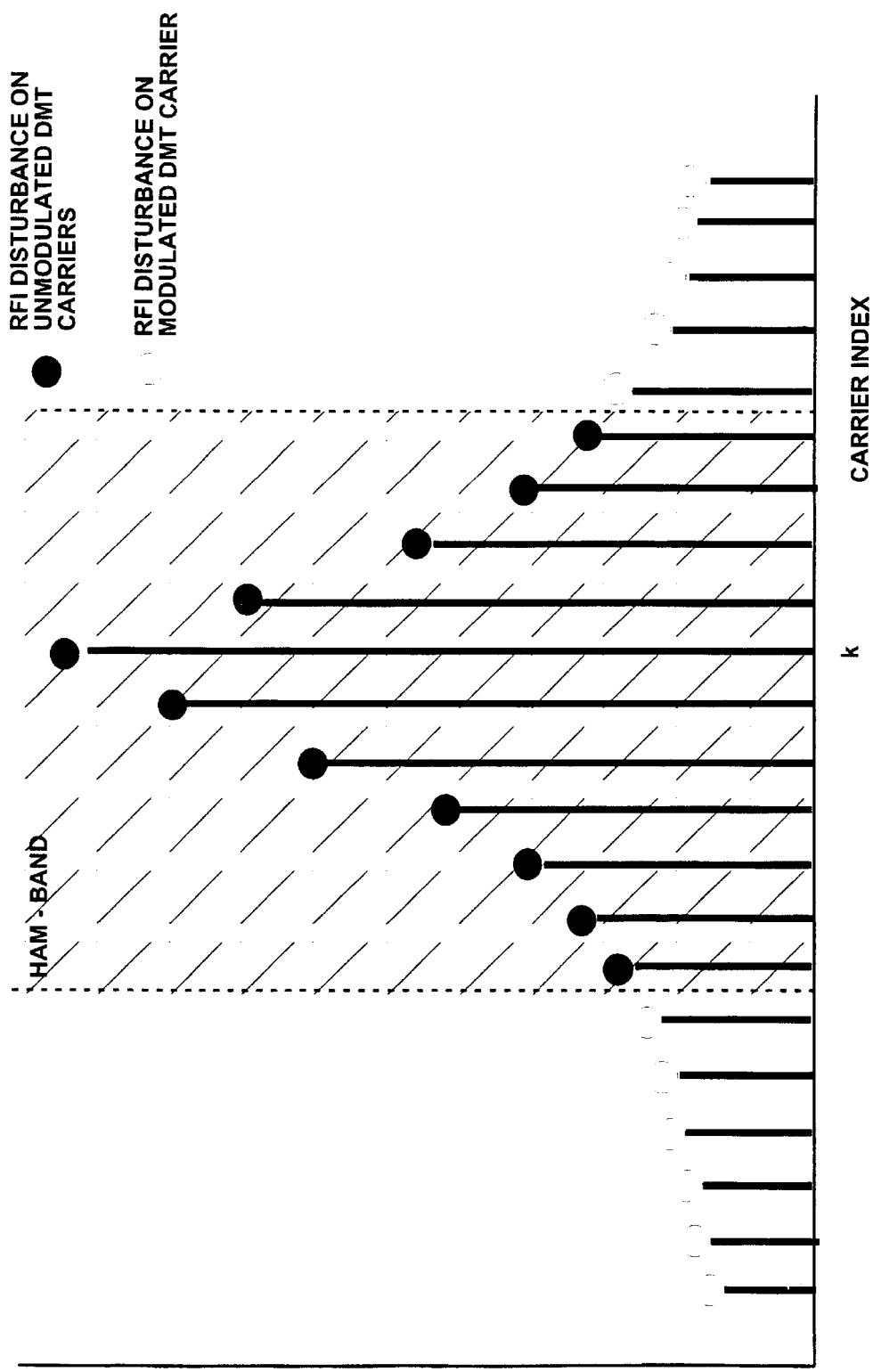
FIG. 3 is a schematic representation of the RFI disturbance, $S_k$, on the DMT carriers in a VDSL system.

FIG. 3 shows the RFI disturbance, on the DMT carriers in a VDSL system. RFI signals are within the HAM band, which is shown in FIG. 3 as a shaded area. Typically, a RFI disturbance signal comes from a radio amateur transmission in a HAM-band which coincides with frequencies where unmodulated DMT carriers reside.

The received signal on the modulated DMT carriers can be written as $$R_m = X_m \cdot H_m + S_m + N_m, \; m \in \{\text{modulated carrier indices}\} = M \quad (1)$$

where $X_m$ is the transmitted data, $H_m$ is the channel frequency response, $S_m$ is background noise, and $N_m$ is the RFI signal. On the unmodulated tones the received signal will be $$R_l = S_l + N_l, \; l \in \{\text{unmodulated carrier indices}\} = U = \{0, 1, \ldots, N-1\} \backslash M = M^c, \quad (2)$$

where $M^c$ is the complement set of M.

The impact of the RFI disturbance on DMT carrier k can be expressed as $$S_k = \int_{-B}^{B} S(f - f_c) G_k(f - f_c) df + \int_{-B}^{B} S(f + f_c) G_k(f + f_c) df, \quad (3)$$

$$k \in [0, 1, \ldots, N-1] = M \cup U$$

where S(f) is the unknown Fourier transform of the RFI signal s(t), B is the half the bandwidth of s(t), fc is the centre frequency location of the RFI signal and where:

$$G_k(f) = \frac{1 - e^{j\frac{4\pi f N}{f_s}}}{1 - e^{j\left(2\pi \frac{f}{f_s} - \frac{\pi}{N}k\right)}} \quad (4)$$

The invention is based on a series expansion of (3). It separates the dependence between the frequency, f, and the DMT carrier index, k, to obtain a linearized model of the RFI disturbance $$S_k \approx \hat{S}_k = \sum_{n=1}^{L+M} \alpha_n \varphi_{k,n}, \; k \in M \cup U, \quad (5)$$

where:

$\varphi_{k,n} : k \in M \cup U$ is a set of known basis functions and $\alpha_n$ are unknown coefficients calculated as described below.

By measuring the disturbance $R_l$, $l \in U$ on at least L+M unmodulated DMT carriers as in (2), an estimate of the disturbance on these carriers can be derived. The unknown parameter coefficients, $\alpha_n$, can then be solved using, for example, a Least-Squares fit. When all L+M parameters $\alpha_n$ are calculated, an estimate of the RFI disturbance on every modulated carrier, $\hat{S}_m$, m∈M, can be obtained using (5). These estimates are then subtracted from the received modulated DMT carriers in order to cancel the RFI disturbance $$Y_m = R_m - \hat{S}_m = X_m H_m + (S_m - \hat{S}_m) + N_m, \; m \in M \quad (6)$$

Alternatively, a Taylor series expansion of parts of $G_k(f)$ around the expected centre frequency location, $\pm f_c$, can be used to obtain the linearized model (5). The model will in this case be of the form $$S_k \approx \hat{S}_k = \sum_{l=0}^{L-1} A_l D_k^{(l)}(-f_c) + \sum_{m=0}^{M-1} B_m D_k^{(m)}(-f_c), \qquad (7)$$

where $\{A_l\} \cup \{B_l\}$ is the set of L+M unknown parameter coefficients that corresponds to $\alpha_n$ in (5) and $D^{(m)}{}_k(f)_c$ is the derivative of the denominator of $G_k(f)$ $$D_k^{(m)}(f_c) = \frac{d^m}{df^m}\left[\frac{1}{1-e^{j\left(2\pi\frac{f}{f_s}-\frac{\pi}{N}k\right)}}\right]f = f_c$$

The set $D^{(m)}{}_k(f)_c$ corresponds to the set of basis functions $\{\phi_{k,n}: k \in M \cup U\}$. The parameters $\{A_l\}$ and $\{B_l\}$ are calculated as above. Then, estimates, $\hat{S}_k$, of the RFI disturbance, are obtained using (7). These estimates are then subtracted from the corresponding modulated DMT tones as showed in (7). The use of a Taylor expansion on $G_k(f)$ gives a fairly simple calculation.

The present invention is useful in any DMT based VDSL system, no matter which duplex method is used.

The technique of the present invention does not require an RFI disturbance signal to be a pure sinusoidal signal at an exactly known frequency. The method for calculating how the disturbance affects the DMT tones is more sophisticated than previous methods because it only assumnes that the disturbance has limited bandwidth and that its frequency location is known approximately.

The present invention can be characterised as a technique for frequency domain RFI cancellation in multi-carrier subscriber line systems, such as VDSL. No assumptions are made about the disturber except that it is narrow banded. It uses measurements of one, or many, carriers in each HAM band to estimate the RFI ingress outside the HAM-bands. This estimate is then subtracted from the received signal.

The present invention may also be characterised by the use of the transfer function $$G_k(f) = \frac{1-e^{j\frac{4\pi N}{f_s}}}{1-e^{j\left(\frac{2\pi f}{f_s}-\frac{\pi}{N}k\right)}}$$

from the RFI disturbance to the DMT carriers (sometimes called the Dirichlet kernel) which is approximated by a linear combination of a predefined set of basis functions. Expressions can be simplified by only approximating the denominator part of $G_k(f)$, in other words the expression:

$$\frac{1}{1-e^{j\left(\frac{2\pi f}{f_s}-\frac{\pi}{N}k\right)}}$$

The approximation and results can be improved if no measurements are used of the carriers closest to the disturbers centre frequencies.

The basis functions, used in the approximation, may be polynomials.

Furthermore, the number of basis functions used may be limited to 1000, or less. In fact it is possible to use less than 10 basis functions.

What is claimed is:

1. A RFI canceller, for use in a subscriber line system using multi-carrier modulation, comprising:

measurement means for measuring a radio frequency interference (RFI) disturbance in carriers falling within a band of frequencies causing said RFI;

estimation means for estimating RFI ingress into carriers outside said band of frequencies by approximating a transfer function from the RFI disturbance to the DMT carriers, by a linear combination of a predefined set of basis functions; and adder means for subtracting an error correcting signal derived from said estimation means from a received signal.

2. A RFI canceller, as claimed in claim 1, wherein said subscriber line system is a VDSL system and said multi-carrier modulation is DMT.

3. A RFI canceller, as claimed in claim 1, wherein said RFI canceller includes:

a demodulator means for demodulating an incoming data stream to provide a first parallel data stream;

a parallel to serial converter for converting said first parallel data stream to a first serial data stream;

a digital to analog converter for converting said first serial data stream to a first analog signal;

an analog RFI canceller circuit for combining said analog signal with an analog error correcting signal, to produce a second analog signal;

an analog to digital converter to convert said second analog signal to a second serial data signal;

a serial to parallel converter for converting said second serial data stream to a second parallel data stream;

a modulator means for modulating said second parallel data stream onto a multiplicity of carriers; and a digital RFI canceller means including said measurement means, said estimation means and said adder means.

4. A RFI-canceller, as claimed in claim 3, further comprising equalizer means connected to an output of said digital RFI canceller means.

5. A RFI canceller, as claimed in claim 3, wherein said demodulator means is adapted to perform an inverse discrete Fourier transformation on an incoming digital signal, and in that said modulator means is adapted to perform a discrete Fourier transformation on an outgoing digital signal.

6. A RFI canceller, as claimed in claim 1, wherein said band of frequencies is narrow compared to a band of frequencies occupied by said multi-carriers.

7. A RFI canceller, as claimed in claim 6, wherein said narrow band of frequencies corresponds to the HAM band.

8. A RFI canceller, as claimed in claim 1, wherein said measurement means operates on at least one carrier within said band of frequencies.

9. A RFI canceller, as claimed in claim 1, wherein the transfer function comprises:

$$G_k(f) = \frac{1-e^{j\frac{4\pi fN}{f_s}}}{1-e^{j\left(\frac{2\pi f}{f_s}-\frac{\pi}{N}k\right)}}$$

with N being a total number of carriers, k being the carrier, and $f_s$ being the sampling frequency.

10. A RFI canceller, as claimed in claim 9, wherein said estimation means approximates only the denominator of $G_k(f)$, namely;

$$\frac{1}{1-e^{j\left(\frac{2\pi f}{f_s}-\frac{\pi}{N}k\right)}}.$$

11. A RFI canceller, as claimed in claim 9, wherein said measuring means only performs measurements on carriers having frequencies that are not close to a center frequency of the RFI disturbance.

12. A RFI canceller, as claimed in claim 9, wherein said basis functions are polynomials.

13. A RFI canceller, as claimed in claim 12, wherein said basis functions $\phi_{k,n}:k \in M \cup U$ are defined by a linearized model of said RFI disturbance $$S_k \approx \hat{S}_k = \sum_{n=1}^{L+M} \alpha_n \varphi_{k,n}$$

where $\alpha_n$ are unknown coefficients calculated by using a least-squares fit technique, M is a set of modulated carriers and L is a subset of unmodulated carriers.

14. A RFI canceller, as claimed in claim 9, wherein said estimation means derives said basis functions by means of a Taylor expansion from a linearized model of said RFI disturbance, namely:

$$S_k \approx \hat{S}_k = \sum_{l=0}^{L-1} A_l D_k^{(l)}(-f_c) + \sum_{m=0}^{M-1} B_m D_k^{(m)}(-f_c)$$

where $\{A_l\} \cup \{B_l\}$ is a set of L+M unknown parameter coefficients calculated by said estimation means.

15. A RFI canceller, as claimed in claim 9, wherein no more than one thousand basis functions are employed.

16. A RFI canceller, as claimed in claim 15, wherein no more than ten basis functions are employed.

17. A subscriber line system using multi-carrier modulation, wherein said subscriber line system includes at least one RFI canceller as claimed in claim 1.

18. A subscriber line system, as claimed in claim 17, wherein said subscriber line system is a VDSL system.

19. A subscriber line system, as claimed in claim 17, wherein said subscriber line system is an ADSL system.

20. A subscriber line system, as claimed in claim 17, wherein said multi-carrier modulation is DMT.

21. A receiver for use with a subscriber line system, wherein said receiver includes a RFI canceller as claimed in claim 1.

22. A method of reducing RFI in a telecommunications wire transmission system using multi-carrier modulation, the method comprising:
  measuring a disturbance signal induced by RFI in carriers falling within a band of frequencies causing said RFI;
  estimating RFI ingress into carriers outside said band of frequencies by approximating a transfer function from the RFI disturbance to the DMT carriers, by a linear combination of a predefined set of basis functions; and
  subtracting an error correcting signal, derived from an estimation of said RFI ingress, from a received signal.

23. A method, as claimed in claim 22, wherein said telecommunications wire transmission system is a VDSL system.

24. A method, as claimed in claim 22, wherein said telecommunications wire transmission system is an ADSL system.

25. A method, as claimed in claim 22 wherein said multicarrier modulation is DMT.

26. A method, as claimed in claim 22, further comprising:
  demodulating an incoming data stream;
  converting demodulated data to a first serial data stream;
  converting said serial data stream to a first analog signal;
  combining said first analog signal with an analog error correcting signal, to produce a second analogue signal;
  converting said second analog signal to a second serial data stream;
  converting said second serial data stream to a parallel data stream;
  modulating said parallel data stream onto a multiplicity of carriers; and then
  measuring the disturbance induced by RFI in carriers falling within said band of frequencies causing said RFI;
  estimating RFI ingress into carriers outside said band of frequencies; and
  subtracting said error correcting signal, derived from the estimation of said RFI ingress, from the received signal.

27. A method, as claimed in claim 26, further comprising equalizing an outgoing data stream.

28. A method, as claimed in claim 26, further comprising performing an inverse discrete Fourier transformation on an incoming digital signal to demodulate said incoming digital signal, and performing a discrete Fourier transformation on an outgoing digital signal to modulate said outgoing signal.

29. A method, as claimed in claim 22, wherein said band of frequencies is narrow compared to a band of frequencies occupied by said multi-carriers.

30. A method, as claimed in claim 29, wherein said narrow band of frequencies corresponds to the HAM band.

31. A method, as claimed in claim 22, further comprising performing said measurements on at least one carrier within said band of frequencies.

32. A method, as claimed in claim 22, wherein the transfer function comprises $$G_k(f) = \frac{1-e^{j\frac{4\pi fN}{f_a}}}{1-e^{j\left(2\pi\frac{f}{f_a}-\frac{\pi}{N}k\right)}}$$

with N being a total number of carriers, k being the carrier, and $f_s$ being the sampling frequency.

33. A method, as claimed in claim 32, wherein approximating includes approximating only the denominator of $G_k(f)$, namely:

$$\frac{1}{1-e^{j\left(\frac{2\pi f}{f_a}-\frac{\pi}{N}k\right)}}$$

34. A method, as claimed in claim 32, wherein measurements are only made on carriers having frequencies that are not close to a center frequency of said RFI disturbance signal.

35. A method, as claimed in claim 32, wherein said basis functions are polynomials.

36. A method, as claimed in claim 35, wherein said basis functions $$\phi_{k,n}: k \in M \cup U$$

are defined by a linearized model of said RFI disturbance $$S_k \approx \tilde{S}_k = \sum_{n=1}^{L+M} \alpha_n \varphi_{k,n}$$

where $\alpha_n$ are unknown coefficients calculated by using a least-squares fit technique, M is a set of modulated carriers and L is a subset of unmodulated carriers.

37. A method, as claimed in claim 32, further comprising deriving said basis functions from a Taylor expansion of a linearized model of said RFI disturbance;

$$S_k \approx \tilde{S}_k = \sum_{l=0}^{L-1} A_l D_k^{(l)}(-f_c) + \sum_{m=0}^{M-1} B_m D_k^{(m)}(-f_c)$$

where $\{A_l\} \cup \{B_l\}$ is a set of L+M unknown parameter coefficients and calculating said set of L+M parameters.

38. A method, as claimed in claim 32, further comprising using no more than one thousand basis functions.

39. A method, as claimed in claim 38, further comprising using no more than ten basis functions.

40. A radio frequency interference (RFI) canceller, for use in a subscriber line system using multi-carrier modulation, comprising:
 a measurement unit to measure a RFI disturbance in carriers within a band of frequencies causing said RFI;
 a calculator to calculate RFI effect on carriers outside said band of frequencies by calculating a transfer function from the RFI disturbance to the DMT carriers with a linear combination of a predefined set of basis functions; and
 an error correction unit to remove the RFI effect from a received signal.

41. A RFI canceller, as claimed in claim 40, wherein said subscriber line system is a VDSL system and said multi-carrier modulation is DMT.

42. A RFI canceller, as claimed in claim 40, further comprising:
 a demodulator to demodulate an incoming data stream to provide a first parallel data stream;
 a parallel to serial converter for converting said first parallel data stream to a first serial data stream;
 a digital to analog converter for converting said first serial data stream to a first analog signal;
 an analog RFI canceller circuit for combining said analog signal with an analog error correcting signal, to produce a second analog signal;
 an analog to digital converter to convert said second analog signal to a second serial data signal;
 a serial to parallel converter for converting said second serial data stream to a second parallel data stream;
 a modulator to modulate said second parallel data stream onto a plurality of carriers; and
 a digital RFI canceller defined by said measurement unit, said calculator and said error correction unit.

43. A RFI canceller, as claimed in claim 42, further comprising an equalizer connected to an output of said digital RFI canceller.

44. A RFI canceller, as claimed in claim 42, wherein said demodulator is adapted to perform an inverse discrete Fourier transformation on an incoming digital signal, and in that said modulator is adapted to perform a discrete Fourier transformation on an outgoing digital signal.

45. A RFI canceller, as claimed in claim 40, wherein said band of frequencies is relatively narrow compared to a band of frequencies of said multi-carriers.

46. A RFI canceller, as claimed in claim 45, wherein said narrow band of frequencies corresponds to the HAM band.

47. A RFI canceller, as claimed in claim 40, wherein said measurement unit operates on at least one carrier within said band of frequencies.

* * * * *

UNITED STATES PATENT AND TRADEMARK OFFICE
CERTIFICATE OF CORRECTION

PATENT NO.    : 6,738,440 B1
DATED         : May 18, 2004
INVENTOR(S)   : Mikael Isaksson et al.

It is certified that error appears in the above-identified patent and that said Letters Patent is hereby corrected as shown below:

<u>Column 11,</u>
Line 18, delete:

$$\text{``} S_k \approx S_k = \sum_{l=0}^{L-1} A_l D^{(l)}{}_k (-f_c) + \sum_{m=0}^{M-1} B_m D^{(m)}{}_k (-f_c) \text{''}$$

Insert:

$$-- S_k \approx S_k = \sum_{l=0}^{L-1} A_l D^{(l)}{}_k (-f_c) + \sum_{m=0}^{M-1} B_m D^{(m)}{}_k (-f_c) --$$

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,738,440 B1
DATED : May 18, 2004
INVENTOR(S) : Mikael Isaksson et al.

It is certified that error appears in the above-identified patent and that said Letters Patent is hereby corrected as shown below:

<u>Column 10,</u>
Line 47, delete:

$$G_k(f) = \frac{1 - e^{j\frac{4\pi f N}{f_a}}}{1 - e^{j(2\pi\frac{f}{f_a} - \frac{\pi}{N}k)}}$$

Insert:

$$G_k(f) = \frac{1 - e^{j\frac{4\pi f N}{f_s}}}{1 - e^{j(2\pi\frac{f}{f_s} - \frac{\pi}{N}k)}}$$

Line 59, delete:

$$\frac{1}{1 - e^{j(\frac{2\pi f}{f_a} - \frac{\pi}{N}k)}}$$

Insert:

$$\frac{1}{1 - e^{j(\frac{2\pi f}{f_s} - \frac{\pi}{N}k)}}$$

<u>Column 11,</u>
Line 18, delete:

"$S_k \approx S_k = \sum_{l=0}^{L-1} A_l D^{(l)}{}_k(-f_\subseteq) + \sum_{m=0}^{M-1} B_m D^{(m)}{}_k(-f_\subseteq)$"

Insert:

-- $S_k \approx S_k = \sum_{l=0}^{L-1} A_l D^{(l)}{}_k(-f_\subseteq) + \sum_{m=0}^{M-1} B_m D^{(m)}{}_k(-f_\subseteq)$ --

This certificate supersedes Certificate of Correction issued September 7, 2004.

Signed and Sealed this

Third Day of May, 2005

JON W. DUDAS
*Director of the United States Patent and Trademark Office*